United States Patent [19]

Ford et al.

[11] 4,210,858
[45] Jul. 1, 1980

[54] HIGH FREQUENCY HIGH VOLTAGE POWER SUPPLY

[75] Inventors: Leland W. Ford, Boulder, Colo.; Alberto M. Ramirez, Tucson, Ariz.; Gerald L. Smith, Broomfield, Colo.

[73] Assignee: International Business Machines Corporation, Armonk, N.Y.

[21] Appl. No.: 897,897

[22] Filed: Apr. 19, 1978

[51] Int. Cl.$^2$ .................. G03G 15/00; H01T 19/00
[52] U.S. Cl. .................. 323/22 T; 361/235; 336/231; 336/165; 363/24
[58] Field of Search ............ 336/189, 190, 225, 231, 336/206, 665; 323/17, 45, 22 T; 363/59, 50, 24; 361/235

[56] References Cited

U.S. PATENT DOCUMENTS

| | | | |
|---|---|---|---|
| 3,445,754 | 5/1969 | Broadhead, Jr. | 323/45 |
| 3,533,010 | 10/1970 | Bowles | 363/59 |
| 3,533,734 | 1/1976 | Fletcher et al. | 323/17 |
| 3,546,571 | 12/1970 | Fletcher et al. | 336/165 |
| 3,784,946 | 1/1974 | Bingen et al. | 336/231 |
| 4,000,443 | 12/1976 | Lever | 363/59 |
| 4,005,352 | 1/1977 | Kugler et al. | 363/50 X |
| 4,028,596 | 6/1977 | Weber | 361/235 |
| 4,038,593 | 7/1977 | Quinn | 323/22 T X |
| 4,084,144 | 4/1978 | Weniger | 336/231 |
| 4,095,165 | 6/1978 | Boros | 323/17 |
| 4,095,205 | 6/1978 | Schroeder et al. | 336/206 |

OTHER PUBLICATIONS

R. Lee, et al., "Influence of Core Gap in Design of Current Limiting Transformers", *IEEE Transactions on Magnetics*, vol. Mag.-9, No. 3, (Sep., 1973), pp. 408–410.

*Primary Examiner*—J. D. Miller
*Assistant Examiner*—L. C. Schroeder
*Attorney, Agent, or Firm*—Robert J. Haase

[57] ABSTRACT

A compact and lightweight power supply particularly suited for use as a high voltage supply capable of switching voltage values in short time. The high voltage output is compared against a desired reference value to produce a difference voltage which is integrated. The integrated difference voltage is converted to recurrent pulses having a corresponding width. The pulses are applied alternately to the opposite ends of a centertapped primary winding of a specially wound transformer characterized by a specially wound secondary winding and an air-gapped E-shaped core linking the primary and secondary windings. The secondary voltage is applied to a voltage multiplier circuit to produce the high voltage output of the power supply.

8 Claims, 7 Drawing Figures

HIGH FREQUENCY HIGH VOLTAGE POWER SUPPLY

BACKGROUND OF THE INVENTION

High voltage power supplies suitable for use in electrophotographic copying machines are known in the art. For example, one such power supply is disclosed in U.S. Pat. No. 3,986,085 for Corona Power Supply Circuit, issued to Harold J. Weber on Oct. 12, 1976. In the cited example, an oscillating circuit produces a series of pulses which are shaped and applied through a step-up transformer to a voltage multiplying circuit. The multiplying circuit provides the desired output voltage.

In certain electrophotographic applications, it is further desirable that the power supply output voltage be regulated in such a way to permit desired rapid changes in the output voltage, for example, where it is desired to quickly change the bias voltage on the developer in order to pin white vectors and provide for toner concentration control as well as for switching to development voltages. It is important, of course, that the voltage switching be accomplished without compromising control over the amplitude of the output voltages produced by the power supply.

SUMMARY OF THE INVENTION

A high voltage power supply is provided having a regulated output voltage or regulated output current adapted for rapid change in voltage or current amplitude. In the case of regulated output voltage, the output voltage is compared with a settable reference voltage and the difference voltage is integrated. The integrated voltage controls the width of recurrent pulses which are applied alternately to the opposite ends of a centertapped primary winding of a transformer. The transformer is provided with an air-gapped core which limits the short circuit output current, and makes the transformer output voltage a very linear function of the width of the recurrent transformer primary pulses. The transformer secondary is specially wound to reduce the tendency toward arcing between turns lying in the same radial plane. In a first species of the invention, the secondary winding of the transformer is separated by insulating tape layers into serially connected cylindrical sections located concentrically about the supporting bobbin, each section having a different radius with respect to the axis of the bobbin. In this case, the secondary winding preferably is pyramidally wound, i.e., the lengths of the sections decrease as distance from the axis of the bobbin increases. In another species, the secondary winding is separated by insulating discs into serially connected cylindrical sections located axially along the supporting bobbin, the sections abutting each other and having the same radius with respect to the axis of the bobbin. Both species limit the number of turns between the innermost and the outermost conductors of the individual sections of the secondary winding and thus reduce the tendency to arc between turns of the secondary winding. The secondary voltage of the transformer is applied to a voltage multiplier circuit which, in turn, provides the high voltage output of the power supply.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

Figure 1:
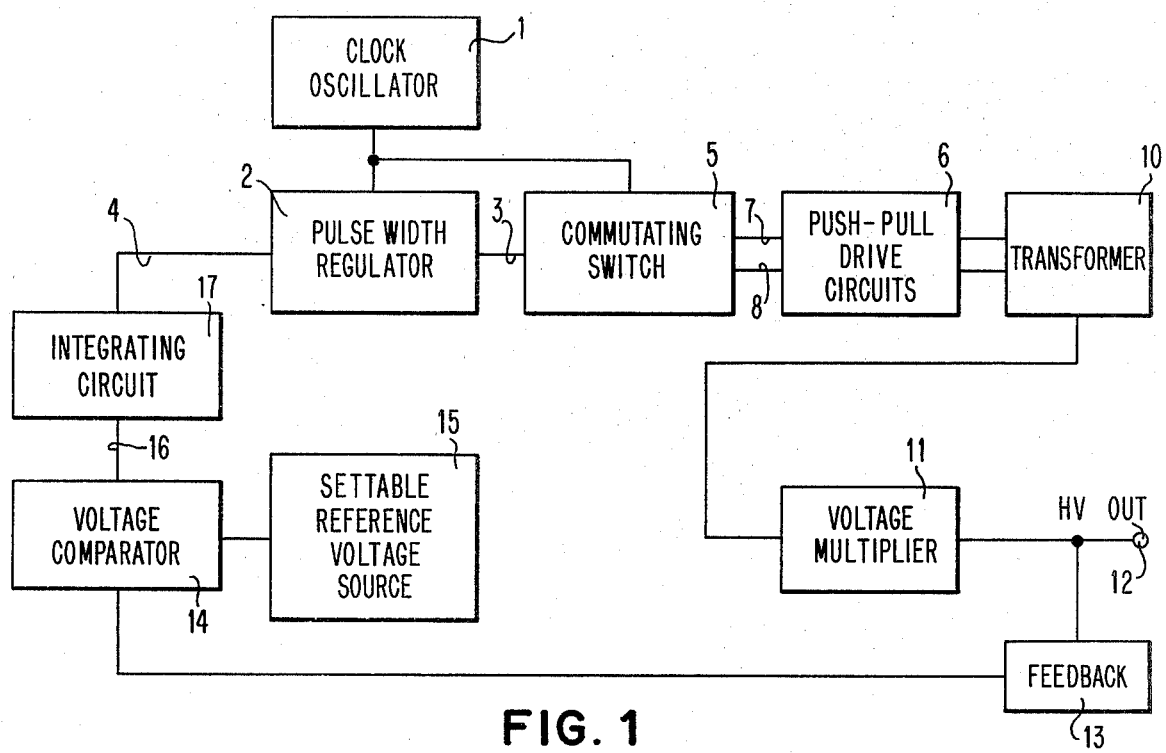
FIG. 1 is a simplified block diagram of a preferred embodiment of the invention.

Referring to FIG. 1, clock oscillator 1 provides a series of recurrent timing pulses which actuate pulse width regulator 2 to produce a corresponding series of pulses on line 3 whose widths are controlled by an input signal applied via line 4. The details of suitable circuit arrangements for providing controllable width pulses are well known in the art and will not be described here.

The recurrent series of pulses are applied via commutating switch 5 to push-pull drive circuits 6, the latter of which is shown in more detail in FIG. 2 to be described later. Switch 5 is driven synchronously by the clock pulses from oscillator 1 to place the sequential pulses from line 3 alternately on lines 7 and 8, i.e., the even-numbered pulses on line 7 and the odd-numbered pulses on line 8. Lines 7 and 8 provide the inputs to push-pull drive circuits 6 which drive the centertapped primary winding of step-up transformer 10. Transformer 10 is specially designed to handle the variable pulse width pulses applied to it in a manner to be described in connection with FIGS. 3, 3A, 3B, 4A and 4B.

The increased amplitude pulses at the output of transformer 10 are applied to voltage multiplier circuit 11 where the amplitude is further increased to provide the high voltage power supply output at terminal 12. Either the output voltage at terminal 12 or the current supplied from said terminal may be regulated as desired. In the case of voltage regulation, the output voltage is fed back via feedback 13 to a first input of voltage comparator 14. Settable reference voltage source 15 is connected to the second input of comparator 14 which provides a voltage on line 16 representing the difference in voltage between the signals received from source 15 and feedback 13. The voltage on line 16 is integrated in circuit 17 to establish the appropriate control voltage on line 4 that will reduce the error between the feedback voltage and the reference source voltage to near zero. The integrated voltage is applied via line 4 to regulator 2. As previously described, the signal on line 4 controls the width of the pulses provided by regulator 2.

In the operation of the embodiment of FIG. 1, the amplitude of the output voltage at terminal 12 is regulated by feedback action to a value determined by the setting of the reference voltage from source 15. Any desired changes in the output voltage (or output current if current feedback control is used) as may be required in some applications, such as in electrophotographic copying machines, can be accomplished rapidly by changing the setting of source 15.

Figure 2:
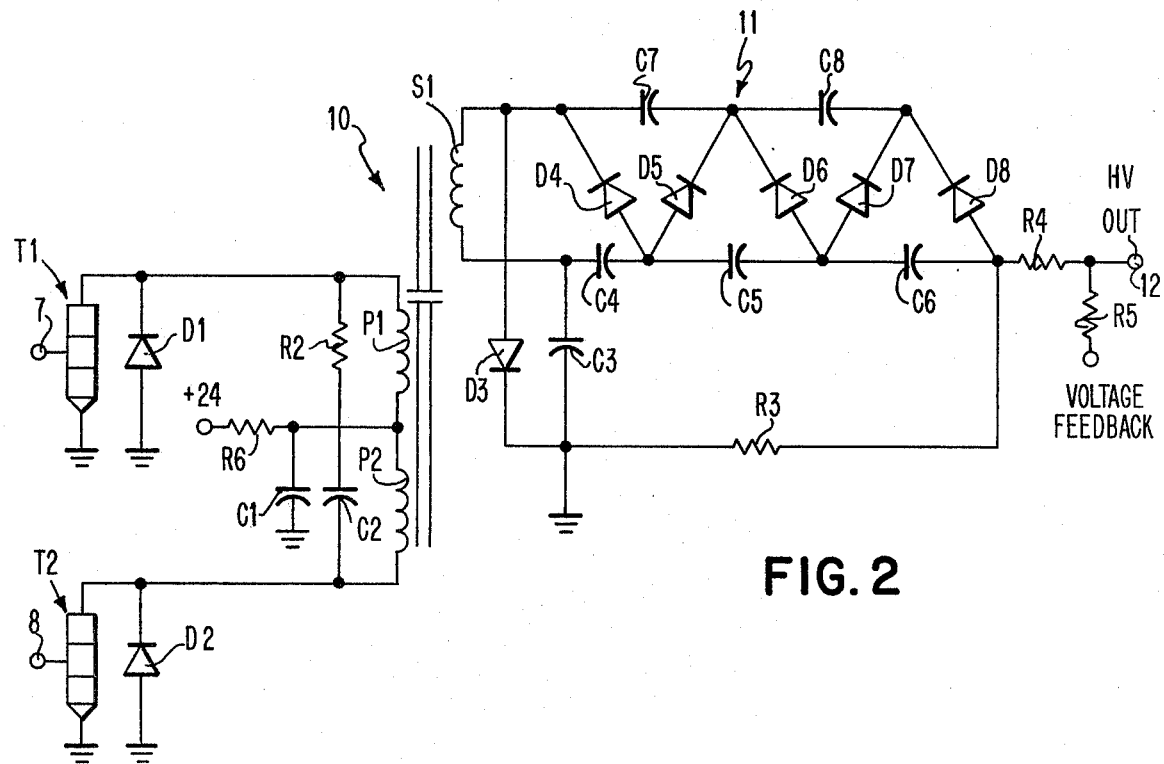
FIG. 2 is a schematic diagram of the transformer and the adjacent circuits as represented in FIG. 1.

FIG. 2 shows the manner in which the push-pull signals on lines 7 and 8 of FIG. 1 are applied to the primary winding of transformer 10. As a result of the action of commutating switch 5, pulses are applied to transistors $T_1$ and $T_2$ in alternate succession. When $T_1$ is turned on, during a given clock pulse interval, current is pulled from capacitor $C_1$ at the centertap between primary segments $P_1$ and $P_2$. Capacitor $C_1$ initially is charged from a d.c. source via resistor $R_6$. When $T_1$ is turned off, and before a pulse occurs on line 8 to turn on transistor $T_2$, current continues to flow in the same direction through the primary of transformer 10 because of the inductance. Instead of flowing through $P_1$ and $T_1$ to ground, however, the current now flows through diode $D_2$ and $P_2$ back to $C_1$. During the next clock pulse interval, the process is repeated but with transistor $T_2$ and $D_1$ successively passing current in the opposite direction through $P_2$ and $P_1$, respectively. Resistor $R_2$ and capacitor $C_2$ form a damping network to stop ringing oscillation.

Capacitors $C_3$ through $C_8$ and diodes $D_3$ through $D_8$ form voltage multiplier network 11 connected to secondary winding $S_1$ of transformer 10. Resistor $R_3$ is a bleeder resistor and resistor $R_4$ provides for current limiting. The output voltage of the power supply of the present invention is produced at terminal 12. Resistor $R_5$ is used to feed back the output voltage to voltage comparator 14 of FIG. 1. If current feedback is employed, resistor $R_5$ is not required. Instead, a voltage corresponding to the current in the ground return lead is used as the feedback signal to voltage comparator 14 of FIG. 1.

Figure 3:
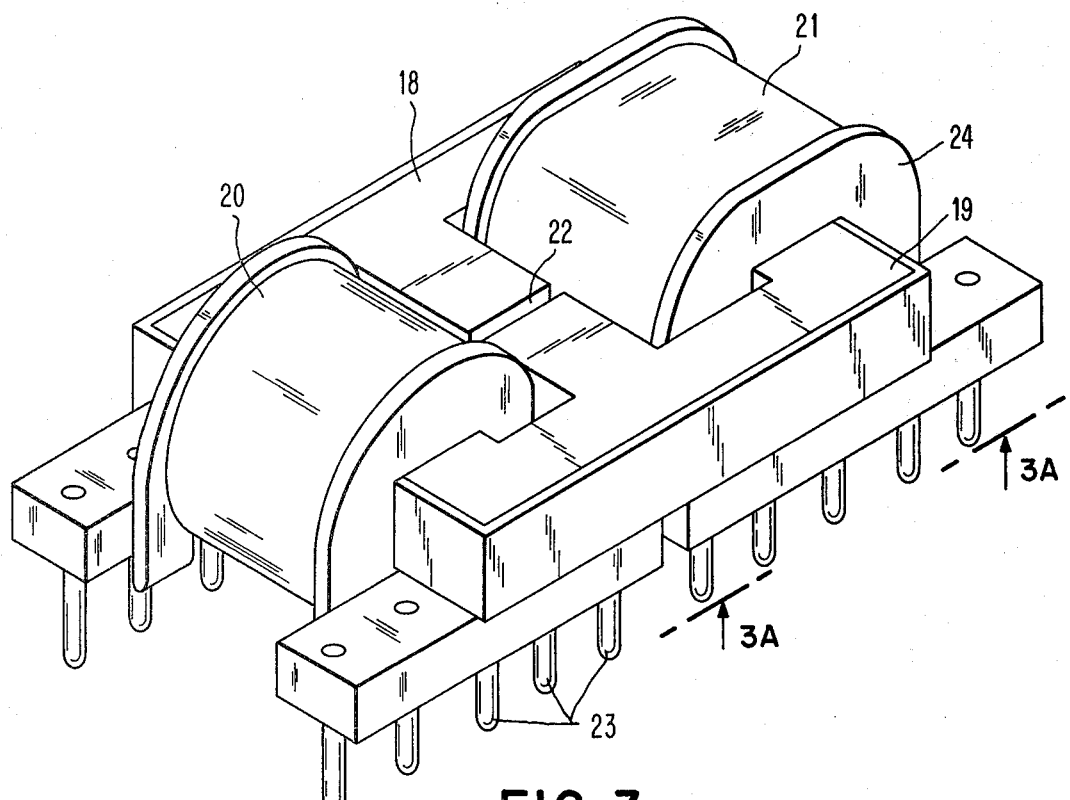
FIG. 3 is a perspective view of a preferred design for the transformer of FIGS. 1 and 2.

The high voltage transformer design is shown in FIG. 3. Two ferrite "E" cores 18 and 19 provide the magnetic path between the primary 20 and secondary 21 windings. The center legs of the "E" cores are cut back to provide an air gap 22. The gap produces a magnetic shunt leakage path between the primary and secondary equivalent to adding an inductor in series with the secondary winding. This feature limits the short circuit output current and makes the transformer output voltage a very linear function of the drive signal pulse width. Transformer efficiency also is enhanced. The separate primary and secondary windings provide good safety isolation. The transformer is connected in the circuit of FIG. 2 via the pins 23 which plug into a corresponding circuit board (not shown).

Figure 3A:
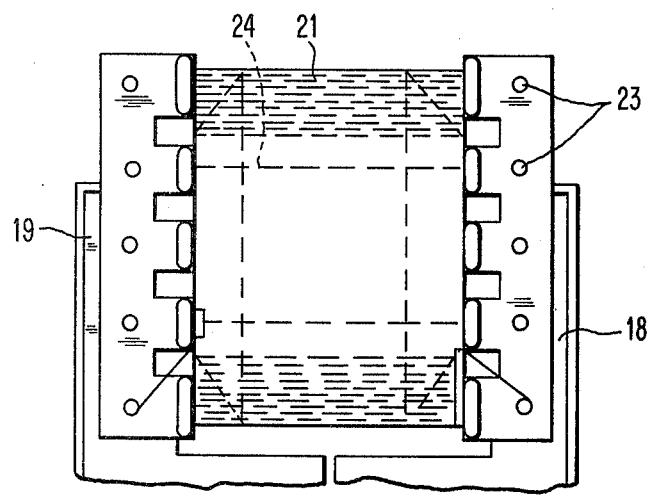
FIGS. 3A and 3B are cross-sectional views of the transformer of FIG. 3.
Figure 3B:
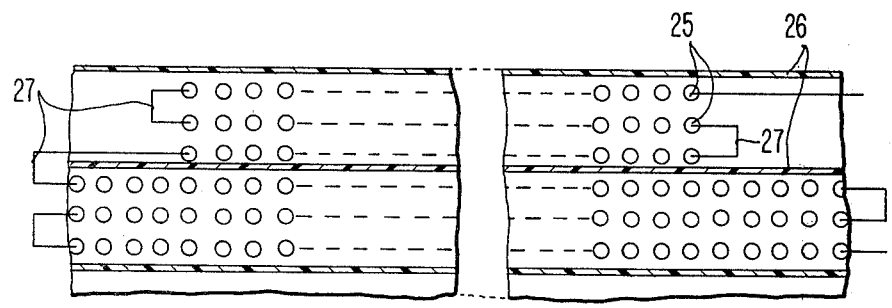

The high voltage secondary winding 21 is specially wound to avoid arcing and corona between the innermost and outermost conductors of the secondary winding. To accomplish this, the layers of the secondary winding are interleaved with an insulating layer such as Mylar tape. Then to assure that there is adequate separation and support between layers, the windings are not wound all the way to the bobbin walls. That is, the number of turns per layer is reduced as the winding is generated from innermost to outermost layers. The insulating tape, as shown in FIGS. 3A and 3B, divides the secondary winding 21 into cylindrical sections. Each section has only a fraction of the total secondary turns and, hence, the tendency toward arcing between the conductors of the overlying turns is reduced.

Referring to FIGS. 3A and 3B, the secondary winding is wound about bobbin 24 in layers of conductors 25 separated by insulating layer 26 as shown in FIG. 3B. The bottom layers (not shown) extend almost over the full length of bobbin 24, but stop short of the bobbin wall so that there is an slight overlay of the insulating layer. The upper layers (such as the uppermost two shown in FIG. 3B) are recessed from the ends of bobbin 24 in the fashion of a stepped pyramid. The connections between the conductors of a lower winding to the conductors of its overlying winding is represented by the lines 27. By virtue of the division of the secondary winding into sections by the insulating of layers, the number of turns between the uppermost and lowermost conductors in each section is reduced to only a fraction of the total number of turns of the secondary winding.

Figure 4A:
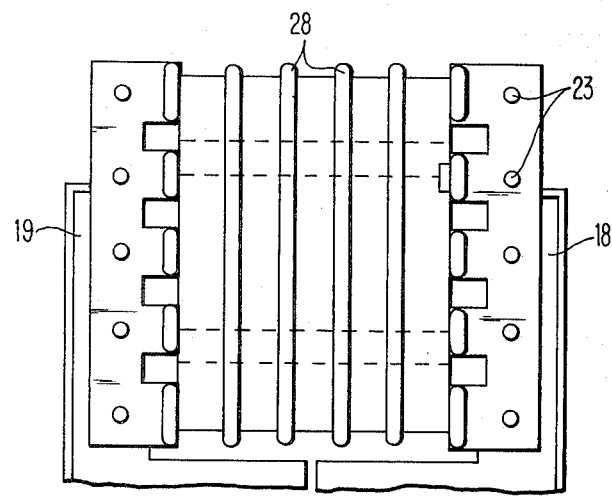
FIGS. 4A and 4B are cross-sectional views of a modification of the transformer design of FIGS. 3A and 3B.
Figure 4B:
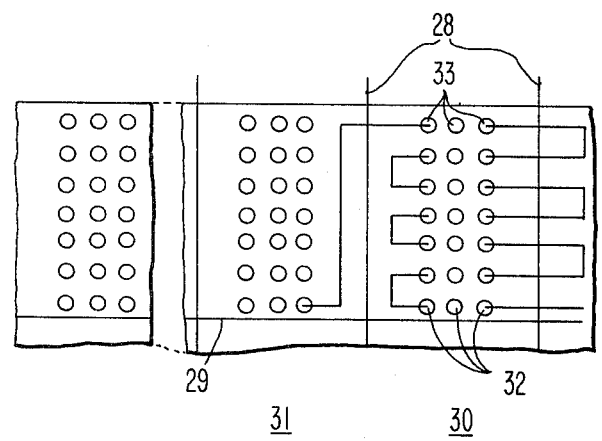

An alternative technique for reducing the number of turns in each section of the secondary winding is shown in FIGS. 4A and 4B. In this case, insulating discs 28 are mounted along the axis 29 of bobbin 24 to divide the secondary winding into a number of serially connected cylindrical sections such as sections 30 and 31. Only three adjacent conductors are shown in each section along axis 29 for the sake of simplicity. A much larger number conveniently can be used in actual practice. In any event, the number of turns between innermost conductors such as conductors 32 and outermost conductors 33 of section 30 (for example) is reduced to only a fraction of the total number of secondary turns whereby the tendency toward arcing between the conductors of a given winding section is reduced.

When this secondary winding technique is used, another insulator (not shown) is required between the secondary bobbin assembly 21 and the center leg of the ferrite E cores in the region of the air gap 22 of FIG. 3. This insulator is required to avoid arcing from the top of the secondary winding to the E cores.

While the invention has been particularly shown and described with reference to the preferred embodiment thereof, it will be understood by those skilled in the art that various changes in form and details may be made therein without departing from the spirit and scope of the invention.

What is claimed is:

1. A power supply providing a regulated output signal adapted for rapid change in signal amplitude comprising:
   a settable reference voltage,
   means for comparing said output signal and said reference voltage to produce a difference voltage,
   a generator of recurrent pulses having widths controllable in response to an input voltage,
   means for applying said difference voltage as said input voltage to said generator,
   a transformer means having separate primary and secondary windings, said recurrent pulses being applied to said primary winding,
   said transformer including an energy storage means for limiting the short circuit output current and for providing a transformer output that is a linear function of the controllable width of said recurrent pulses,
   said secondary winding being divided into serially connected cylindrical winding sections, each section having a fraction of the total number of turns of said secondary winding, the turns of adjacent sections being insulated from each other, and
   a voltage multiplier connected to said secondary winding and providing said output signal.

2. The power supply defined in claim 1 and further including,
   means for integrating said difference voltage and applying the integrated difference voltage as said input voltage to said generator.

3. The power supply defined in claim 1 wherein said transformer energy storage means is an air-gapped magnetic core shunt path across the magnetic path linking said primary and secondary windings.

4. The power supply defined in claim 1 wherein said primary winding is centertapped and said recurrent pulses are applied alternately to the opposite ends of said centertapped primary winding.

5. The power supply defined in claim 1 wherein said secondary winding is divided by spaced insulating cylinders into overlapping cylindrical winding sections having respective radii and being concentric with each other.

6. The power supply defined in claim 5 wherein the lengths of said sections vary inversely with the radii thereof.

7. The power supply defined in claim 1 wherein said secondary winding is divided by spaced insulating discs into abutting cylindrical winding sections having the same radius and being coaxial with each other.

8. The power supply defined in claim 1 and further including,
- means for integrating said difference voltage and for applying the integrated difference voltage as said input voltage to said generator,
- wherein said transformer energy storage means is an air-gapped megnetic core shunt path across the magnetic path linking said primary and secondary windings,
- wherein said primary winding is centertapped and said recurrent pulses are applied alternately to the opposite ends of said centertapped primary winding, and
- wherein said secondary winding is pyramidally wound with a decreasing number of turns in a direction radially away from the axis of said secondary winding.

* * * * *